(12) United States Patent
Mitchell et al.

(10) Patent No.: US 10,293,587 B2
(45) Date of Patent: May 21, 2019

(54) SUBSTRATE FOR A LABEL LAMINATE, A LABEL LAMINATE AND A METHOD FOR MANUFACTURING A LABEL LAMINATE

(71) Applicant: UPM Raflatac Oy, Tampere (FI)

(72) Inventors: Noel Mitchell, Wuppertal (DE); Matti Manner, Tampere (FI); Tom Saxberg, Tampere (FI)

(73) Assignee: UPM RAFLATAC OY, Tampere (FI)

( * ) Notice: Subject to any disclaimer, the term of this patent is extended or adjusted under 35 U.S.C. 154(b) by 0 days.

(21) Appl. No.: 15/032,827

(22) PCT Filed: Nov. 6, 2013

(86) PCT No.: PCT/FI2013/051046
§ 371 (c)(1),
(2) Date: Apr. 28, 2016

(87) PCT Pub. No.: WO2015/067839
PCT Pub. Date: May 14, 2015

(65) Prior Publication Data
US 2016/0251549 A1   Sep. 1, 2016

(51) Int. Cl.
*B32B 7/06* (2019.01)
*B32B 27/08* (2006.01)
(Continued)

(52) U.S. Cl.
CPC ............... *B32B 37/08* (2013.01); *B32B 7/06* (2013.01); *B32B 7/12* (2013.01); *B32B 27/08* (2013.01);
(Continued)

(58) Field of Classification Search
CPC .. C09J 7/0232; C09J 7/0235; C09J 2423/106; C09J 2201/606; C09J 2203/334;
(Continued)

(56) References Cited

U.S. PATENT DOCUMENTS 4,713,273 A   12/1987 Freedman
5,700,571 A   12/1997 Logue et al.
(Continued)

FOREIGN PATENT DOCUMENTS

WO   9311933 A1   6/1993
WO   0146314      6/2001

OTHER PUBLICATIONS

International Search Report dated Feb. 26, 2016; International Application No. PCT/FI2013/051046; International Filing Date Nov. 6, 2013 (12 pages).
(Continued)

*Primary Examiner* — Patricia L. Nordmeyer
(74) *Attorney, Agent, or Firm* — Cantor Colburn LLP

(57) ABSTRACT

The invention relates to a label laminate and a release liner of the label laminate. According to an embodiment release liner comprises a substrate comprising propylene block copolymer. The substrate may be oriented in a machine direction of the substrate. The substrate may have an elongation of the substrate in a machine direction of the substrate is less than 3% at a tension level between 200 and 1200 N/m. The substrate may have a ratio of 1% secant modulus in machine direction of the substrate to elongation in transverse direction of the substrate is between 2 and 15. Further the invention relates to a use of a release liner for self-adhesive label laminate and to a method for providing a label laminate.

28 Claims, 3 Drawing Sheets

(51) Int. Cl.
*B32B 37/08* (2006.01)
*B32B 7/12* (2006.01)
*B32B 37/12* (2006.01)
*B32B 27/18* (2006.01)
*B32B 27/32* (2006.01)
*B32B 38/00* (2006.01)
*C09J 7/40* (2018.01)

(52) U.S. Cl.
CPC .............. *B32B 27/18* (2013.01); *B32B 27/32* (2013.01); *B32B 37/12* (2013.01); *B32B 38/0012* (2013.01); *C09J 7/403* (2018.01); *C09J 7/405* (2018.01); *B32B 2038/0028* (2013.01); *B32B 2307/516* (2013.01); *B32B 2307/736* (2013.01); *B32B 2307/748* (2013.01); *B32B 2519/00* (2013.01); *C09J 2201/606* (2013.01); *C09J 2203/334* (2013.01); *C09J 2205/114* (2013.01); *C09J 2423/106* (2013.01); *C09J 2453/006* (2013.01)

(58) Field of Classification Search
CPC ........... C09J 2453/006; C09J 2205/114; Y10T 428/14; B32B 7/06; B32B 7/12; B32B 27/08; B32B 27/18; B32B 27/32; B32B 37/08; B32B 37/12; B32B 38/0012; B32B 2307/516; B32B 2307/736; B32B 2307/748; B32B 2519/00; B32B 2038/0028
See application file for complete search history.

(56) References Cited

U.S. PATENT DOCUMENTS

| 5,709,937 | A | 1/1998 | Adams et al. | |
|---|---|---|---|---|
| 5,728,469 | A | 3/1998 | Mann et al. | |
| 5,807,632 | A | 9/1998 | Pedginski et al. | |
| 6,303,201 | B1* | 10/2001 | Baierl | G09F 3/04 283/80 |
| 6,919,405 | B2* | 7/2005 | Kinning | C09J 123/06 525/191 |
| 7,150,802 | B2* | 12/2006 | Pinchen | B65B 61/025 156/324 |
| 7,165,888 | B2* | 1/2007 | Rodick | B65D 33/1691 383/211 |
| 8,377,535 | B2* | 2/2013 | Nakagawa | C09J 7/0228 428/141 |
| 2008/0206505 | A1 | 8/2008 | Blackwell et al. | |
| 2011/0318557 | A1* | 12/2011 | Mitchell | B32B 7/06 428/220 |
| 2012/0060997 | A1 | 3/2012 | Mitchell et al. | |

OTHER PUBLICATIONS

Written Opinion dated Feb. 26, 2016; International Application No. PCT/FI2013/051046; International Filing Date Nov. 6, 2013 (3 pages).

"Developments in Pressure-Sensitive Products", Second Edition, Istvan Benedek, Ed.; Taylor & Francis Group, LLC 2006; Chapters 3 and 5.

\* cited by examiner

SUBSTRATE FOR A LABEL LAMINATE, A LABEL LAMINATE AND A METHOD FOR MANUFACTURING A LABEL LAMINATE

CROSS-REFERENCE TO RELATED APPLICATIONS

This application is a National Stage application of PCT/FI2013/051046, filed Nov. 6,2013, which is incorporated by reference herein in its entirety.

FIELD OF THE APPLICATION

The application concerns a substrate and especially a release liner for self-adhesive labels. Further the application concerns a label laminate comprising a face layer, a release liner and an adhesive layer. The application also concerns manufacturing of the label laminate.

BACKGROUND OF THE APPLICATION

It is general practice to apply a label to a surface of an item to provide decoration, and/or to display information about the product being sold, such as the content of the item, a trade name or logo. The label comprises at least a face layer. Usually the label comprises also an adhesive layer and a release liner. The face layer and release liner are typically laminated together having an adhesive layer in between, which laminated structure is referred to as a label laminate. The release liner is used to protect the adhesive layer but also to allow easier handling of the label to up to the point where the label face layer is dispensed and adhered to a surface of an item.

SUMMARY OF THE APPLICATION

It is an object of the application to provide a substrate for a release liner and a label laminate comprising the release liner. Another object of the application is to provide a method for manufacturing a label laminate.

According to an embodiment a label laminate comprises a face stock, a release liner and an adhesive layer between the face stock and the release liner, wherein the release liner comprises a substrate comprising propylene block copolymer, and the substrate is oriented in a machine direction of the substrate.

According to an embodiment a label laminate comprises a face stock, a release liner and an adhesive layer between the face stock and the release liner, wherein the release liner comprises a substrate comprising propylene block copolymer, and an elongation of the substrate in a machine direction of the substrate is less than 3% at a tension level between 200 and 1200 N/m.

According to an embodiment a label laminate comprises a face stock, a release liner and an adhesive layer between the face stock and the release liner, wherein the release liner comprises a substrate comprising propylene block copolymer, and a ratio of 1% secant modulus in machine direction of the substrate to elongation in transverse direction of the substrate is between 2 and 15.

A method for manufacturing a label laminate according to embodiments comprises: forming a substrate by melt processing technique; stretching the substrate in a machine direction of the substrate so as to provide a machine direction oriented substrate; coating one surface of the machine direction oriented substrate with a release agent layer so as to form a release liner; applying an adhesive layer over the release agent layer and/or over a face material layer; and laminating the release liner with the face material layer so as to form the label laminate having the adhesive layer in between the release liner and the face material layer.

Further embodiments of the invention are presented in dependent claims.

According to an example, an amount of propylene block copolymer of the substrate is at least 38 wt. %. Alternatively, an amount of propylene block copolymer is at least 68 wt. %.

According to an example, the substrate further comprises a release agent layer. In a label laminate structure the release agent layer is arranged between the adhesive layer and the substrate of the release liner.

According to an example, the substrate further comprises propylene homopolymer and/or propylene random copolymer. An amount of propylene homopolymer and/or propylene random copolymer is at most 60 wt. % or at most 30 wt. %.

According to an example, the substrate further comprises between 0.01 and 0.05 wt. % of a nucleating agent.

According to an example, the substrate comprises olefin based polymer(s) other than polypropylene less than 10 wt. %, preferably less than 5 wt. % or less than 2 wt. %.

According to an example, the substrate has a multilayer structure comprising at least a core layer, a first skin layer and a second skin layer. Each of the layers comprises at least 38 wt. % polypropylene block copolymer and at most 60 wt. % of at least one of the following: propylene homopolymer and propylene random copolymer. The skin layer(s) may further comprise anti-blocking agent.

According to an example, the substrate has an orientation degree in the machine direction of the substrate between 5 and 10, preferably between 6 and 9.

According to an example, overall thickness of the substrate is between 10 and 60 microns, preferably between 15 and 40 microns, more preferably between 20 and 30 microns.

According to an example, the oriented substrate has a shrinkage less than 5%, preferably less than 2%, or more preferably less than 1% at temperatures below 30 degrees C.

According to an example, the adhesive layer comprises or consist of a pressure sensitive adhesive. The label laminate may be self-adhesive.

According to an example, the method further comprises a cooling step after the stretching. Thus the machine direction oriented substrate may be directly cooled after the stretching to an ambient temperature without e.g. an annealing step. According to an example, the method further comprises an annealing step prior to cooling.

DESCRIPTION OF THE DRAWINGS

In the following some examples and embodiments of the invention will be described in more detail with reference to appended drawings, in which.

DETAILED DESCRIPTION OF THE APPLICATION

Figure 1:
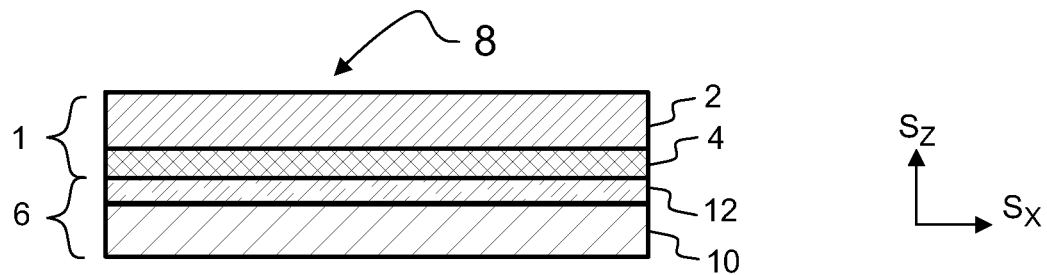
FIG. 1 shows, in a cross sectional view, an example embodiment of a laminated structure for labels.

In this description and claims, the percentage values relating to an amount of raw materials are percentages by weight (wt. %) unless otherwise indicated. The following reference numbers and denotations are used in this application:
Sx, Sy, Sz orthogonal directions,
TD transverse direction,
CD cross direction,
MD machine direction,
MRK1 graphics,
  1 a label,
  2 a face layer,
  4 an adhesive layer,
  6 a release liner,
  8 a label laminate structure (a label laminate web),
  10 a substrate (a backing material),
  12 a release coating layer,
  14 a core layer,
  16 a first skin layer,
  18 a second skin layer.

In this application term "label" 1 refers to a product that comprises at least a face layer 2 and an adhesive layer 4. Via adhesive layer the label is attached to an item. Further the label typically includes graphical patterns on its face layer. Advantageously, the face layer 2 is laminated together with a release liner 6 having the adhesive layer 4 in between so as to provide a label laminate. During manufacturing of a label 1, the adhesive layer may be applied over the face layer 2, and/or over the release liner 6 prior to lamination step. Term "label laminate web" 8 refers to a continuous structure for labels comprising a face layer 2, an adhesive layer 4 and a release liner 6. Individual labels are die-cut from the continuous label laminate web. When the label is used i.e. labelled to an item, the face layer is attached to the surface of an item through an adhesive layer. The release liner is removed prior to labelling.

The term "face layer" 2 refers to a top layer of the label, also called as a face stock, or a face material layer. The face layer 2 is the layer that is adhered to the surface of an item during labelling through an adhesive layer. The face layer may comprise e.g. printing in order to provide information and/or visual effect, such as information of the content of the item labelled. The printing may exist on a top surface, reverse side or both top and reverse side of the face layer. A label consisting of a face layer, printing layer and an adhesive layer may be referred to as "a printed label". The face layer may have a monolayer or multilayer film structure comprising at least two layers. The multilayer structure may be co-extruded or it may comprise several layers laminated together. The face layer may be paper based. Alternatively it may be plastic, i.e. based on polymeric raw materials.

The term "release liner" 6 refers to a structure comprising a backing material layer 10 as a substrate and a release coating layer 12 on a surface of the substrate. In other words, the backing material 10 is usually coated with a thin layer of release agent, such as silicone. The release coating layer provides a non-adherent surface and low adhesion release effect against the adhesive layer. The release liner protects the adhesive layer during shipment and storage. It further allows for efficient handling of individual labels after the labels are die-cut and the surrounding matrix is stripped up to the point where the individual labels are dispensed on a labelling line. During dispensing the liner is peeled off and discarded. The release liner may be further recycled or re-used.

The substrate will also be referred to as a backing material or a backing film hereinafter. The release liner may comprise, for example, glassine or kraft paper, or polymeric film as a backing material.

The release agent provides a low release force and ensures separation of the label 1 containing face layer 2 and adhesive layer 4 from the release liner 6. In other words, the release layer allows easy delamination of the label laminate and easy application of the label 1 onto the article to be labelled.

Figure 5:
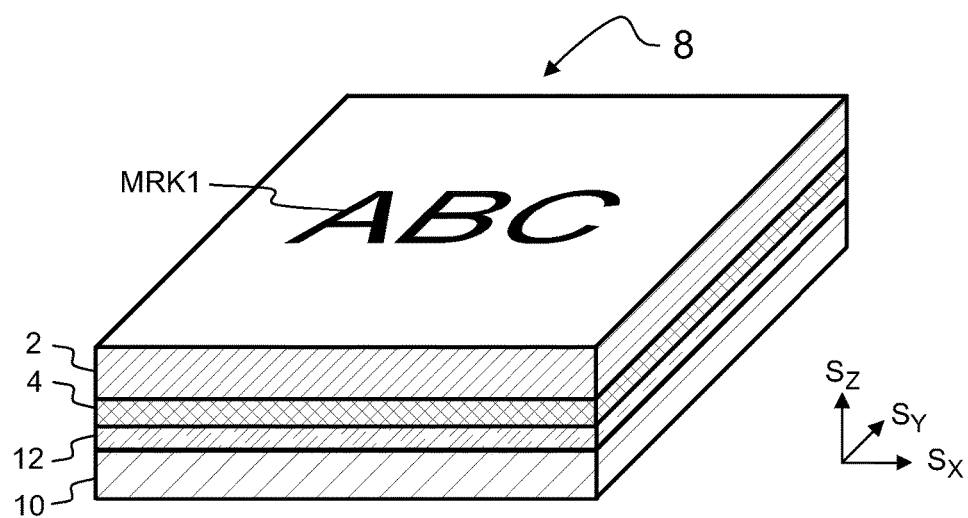
FIG. 5 shows a perspective view of a label laminate structure.

FIG. 1 presents an example embodiment of a laminated label web structure 8. The label web 8 may comprise a face layer 2, a release liner 6 and an adhesive layer 4. The adhesive layer may be applied on the face layer 2 and/or onto the release liner 6 during the label laminate web manufacturing. Referring to FIG. 1, the adhesive layer 4 is between the release layer 12 of the liner 6 and the face layer 2. Referring to FIG. 5, the laminated label structure may further comprise printing MRK1. A top surface of the face layer 2 may be printed. The printing may be subsequently top coated in order to protect the printing. Alternatively or in addition, the reverse side of the face layer adjacent to the adhesive layer 4 may be printed.

Thanks to the adhesive layer 4 the label 1 can be affixed to the substrate, i.e. to the surface of an item (article), such as a surface of a bottle. The adhesive layer may consist of a pressure sensitive adhesive (PSA). The labels consisting of PSA can be adhered to most surfaces through an adhesive layer without the use of a secondary agent, such as a solvent, or heat to strengthen the bond. The PSA forms a bond when pressure is applied onto the label at room temperature, adhering the label to the product to be labelled. The label comprising pressure sensitive adhesive may be referred to as a pressure sensitive adhesive (PSA) label. Pressure sensitive adhesive labels may also be referred to as self-adhesive labels. Label laminates comprising pressure sensitive adhesive may be referred to as self-adhesive label laminates.

The adhesive layer may consist of at least one of the following, a water based adhesive, a solvent based adhesive and a hot melt adhesive. If the adhesive layer is to be applied onto the face layer 2, the adhesive layer may consists of, for example, UV-curable hot melt which is cured by UV light after coating. Chemical composition of the adhesive may be based on acrylic polymers, e.g. acrylic polymers can be used as pressure sensitive adhesives. Tackifiers may be used in order to improve adhesion properties of acrylic adhesives. Alternatively, the adhesive may be a rubber based adhesive made of a synthetic or natural rubber. Rubber based adhesives contain, in addition, tackifier resin(s).

Figure 2:
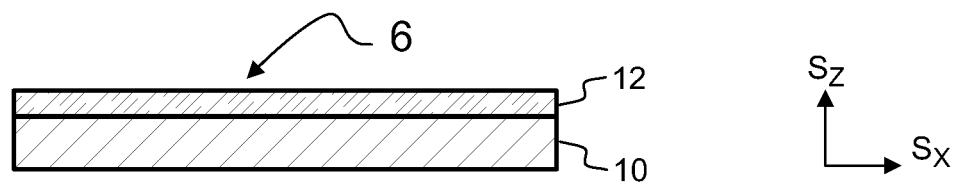
FIG. 2 shows, in a cross sectional view, an example embodiment of a release liner.

FIG. 2 presents an example embodiment of a release liner 6 having a release coating layer 12 on top of the substrate 10. Further, the release liner may comprise at least one adhesive layer on top of the release coating layer 12.

The release liner 6 is used to protect the adhesive layer 4 and to allow easier handling of the label web 8 up to the point where the labels 1 are die cut, dispensed and adhered to a surface of an item.

The substrate 10 of the release liner 6 may consist of a polymeric (plastic) film. In other words, the substrate may be mainly based on polymeric raw materials. The substrate may comprise polyester film, such as polyethylene terephthalate (PET). The polyester film may be biaxially oriented in both machine and transverse (cross) directions. Alternatively, the substrate of the release liner may be polyolefin based. The substrate may comprise or consist of polyethylene (PE). Alternatively, the substrate may comprise or consist of polypropylene (PP). The substrate 10 may be a single layer plastic film (monolayer) or it may comprise several layers (multilayer). Preferably, the substrate consists of a multilayer structure having at least 2 layers. For example, the substrate consists of a multilayer structure having three or five layers.

A release coating layer 12 may consists of a material having high repellence properties towards the adjacent adhesive layer. The release coating may consists of silicone, for example, cross linkable silicone which can be applied to the substrate film and cured into a cross-linked silicone, i.e. into a poly dimethyl siloxane network (PDMS). In order to achieve a silicone release coating layer a solvent-based, emulsion-based or solventless silicone systems may be used. The silicone may be cured, for example, by heat, UV radiation, LED or electron beam. UV curable silicone may be preferred if low melting plastic film substrates are used, such as low density polyethylene.

Figure 4:
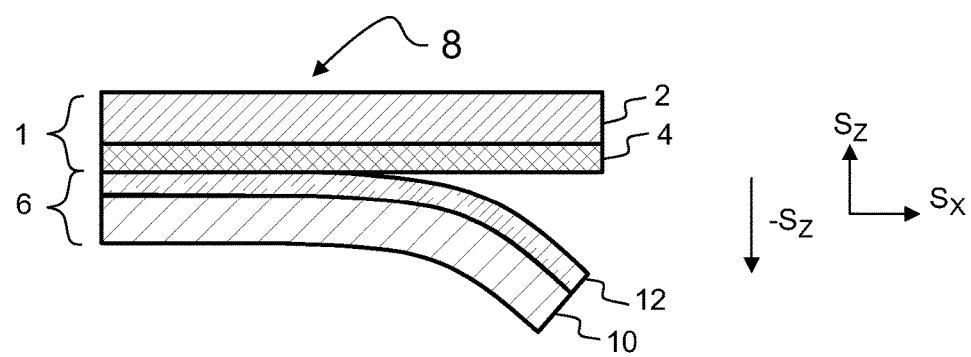
FIG. 4 shows, in a cross-sectional view, separating a label from a release liner.

The release coating layer may consists of silicone. Silicone content may be less than 2 $g/m^2$, less than 1.5 $g/m^2$ or less than 1 $g/m^2$ (dry grammage). The amount of silicone may be at least 0.01, 0.02 or 0.1 $g/m^2$. The amount of silicone may be between 0.1 and 1.5 $g/m^2$ or between 0.4 and 1.5 $g/m^2$ or between 0.6 and 1 $g/m^2$, for example 1 $g/m^2$. Due to the release agent, such as silicone, the release liner 6 can be easily removed from the adhesive layer 4 of the face layer 2 during labelling i.e. prior to application of the label to the surface of an item, as shown in FIG. 4. Plastic films are preferably used for the substrate of release liner in order to achieve good evenness, such as smooth surface.

Figure 3:
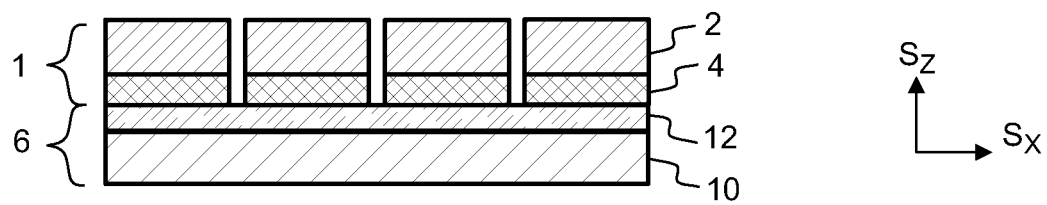
FIG. 3 shows, in a cross-sectional view, an example embodiment of a laminated structure comprising die-cut labels.

Referring to FIG. 3, individual labels 1 may be cut from laminated label web structure 8. In particular, the labels 1 may be die-cut from the web 8. After cutting, the labels may be attached to a common liner 6, which remains uncut. Thus, a plurality of labels may remain attached to a common continuous liner 6. Alternatively, the labels 1 may be completely separate, i.e. also the liner 6 may be cut. Referring to FIG. 4, the label 1 may be separated from the liner 6 e.g. by pulling the liner 6 in the direction —$S_z$ with respect to the label 1. Thus, a surface of the adhesive layer 4 may be exposed so that said surface can be attached to an item.

The non-oriented plastic based substrate of a release liner may be produced by melt processing technique, such as extrusion or co-extrusion process. For example, by cast-film or blown-film manufacturing. The non-oriented substrate may be subsequently oriented (stretched) in an in-line or an off-line process.

According to an embodiment a substrate of a release liner is oriented in one direction i.e. the substrate is uniaxially oriented. Uniaxial orientation, also referred to as monoaxial orientation (MO), refers to the stretching (drawing) provided only in one direction. Substrate may be uniaxially oriented in machine direction (MD), i.e. in the direction of the longitudinal movement of the continuous substrate. Referring to FIGS. 1-6, the direction $S_x$ corresponds to the machine direction (MD) of the substrate. With reference to FIG. 5, the direction $S_y$ corresponds to the transverse direction (TD) of the substrate. TD is also referred to as a cross direction (CD) of the substrate.

A degree of orientation of the substrate, which is in at least one direction, may be between 5 and 10, preferably between 6 and 9. The degree of orientation e.g. between 5 and 10 may also be referred to as orientation ratio or stretching ratio between 1:5 and 1:10.

Orientation degree is a the thickness of the oriented (stretched) substrate relative to that of the non-oriented (non-stretched) substrate. The non-oriented substrate thickness is the thickness after extrusion and subsequent chilling of the substrate. When stretching the substrate, the thickness of the substrate diminishes in the same ratio as the substrate is stretched or elongated. For example, a plastic substrate may have a thickness of 100 micrometers before orientation. After the uniaxial orientation (stretching) the substrate may have a fivefold diminished thickness of 20 micrometers. Thus, the orientation degree of the substrate is 5.

During stretching the randomly oriented polymer chains of the extruded plastic substrate are oriented in the direction of stretching (drawing). Orientation under uniaxial stress provides orientation of polymer chains of the plastic substrate in the direction of stress provided. In other words, the polymer chains are oriented at least partially in the direction of stretching (drawing). Thus, the oriented substrate comprises or consists of polymer chains having specific orientation degree in the direction of stretching. The degree of orientation of the polymer chains depends on amount of stretching of the substrate. Thus, the polymer chains in the substrate having higher orientation degree are more oriented when compared to the substrate having lower orientation degree.

Through a machine direction orientation process, the substrate is uniaxially stretched in the machine direction of the substrate i.e. in the direction of the movement of the substrate (longitudinal direction of the continuous film). Stretching is normally done by means of a machine direction orienter via rolls with gradually increasing speed. Alternatively, the stretching is done by means of orienter via rolls with rapidly increasing speed. The stretching occurs due to a difference in speed between the last and the first rolls. The rolls are heated sufficiently to bring the substrate to a suitable temperature, which is normally below the melting temperature ($T_m$), or around the glass transition temperature ($T_g$) of the polymer.

According to an embodiment, the substrate is uniaxially oriented in machine direction (MDO). An orientation degree of the MDO substrate, i.e. stretched film thickness relative to non-stretched film thickness, is between 5 and 10, preferably between 6 and 9. An orientation degree of uniaxially oriented substrate may be, for example, 5 or 6, preferably 7 or 8. For example, oriented substrate has orientation degree in machine direction between 5 and 10, preferably between 6 and 9.

Monoaxial orientation of the substrate in machine direction may have effect on durability/stability of the substrate under tension in the direction of orientation. Machine direction orientation degree between 5 and 10 effects on the modulus and stiffness of the substrate in the machine direction. Further, orientation reduces the elongation of the substrate in said orientation direction. For example, with increasing orientation degree in machine direction the modulus and stiffness of the substrate increases in said direction (MD). For example, reduced elongation of the liner in the machine direction during the subsequent printing and dispensing process when converting and applying labels is achieved.

A method for manufacturing a label laminate according to embodiments of the invention comprises forming a substrate by melt processing technique from the raw materials including at least propylene block copolymer so as to form a continuous non-oriented substrate. Stretching of the continuous non-oriented substrate in a machine direction of the substrate with a specific orientation ratio provides a machine direction oriented substrate. Coating of one surface of the machine direction oriented substrate with a layer of release agent is provided so as to form a release liner. The release liner is further attached to a face material layer during a lamination step for forming a label laminate. An adhesive layer is applied over the face material layer and/or over the release agent layer of the release liner prior to lamination step. According to an example, the method further comprises cooling of the oriented substrate to an ambient temperature after the stretching for forming a non-annealed substrate. Cooling of the machine direction oriented substrate is performed right after the stretching of the substrate i.e. cooling step directly follows the stretching in order to provide a non-annealed substrate. According to an example, the method comprises an annealing of the substrate after the stretching step for forming an annealed substrate. After annealing a cooling of the annealed substrate to an ambient temperature is provided.

According to an embodiment, the machine direction oriented substrate is annealed (heat-set) after stretching for providing an annealed substrate. Annealing of the substrate may be performed in an annealing section, which allows stress relaxation of the oriented substrate by keeping the substrate at an elevated temperature for a period of time. After annealing, the substrate is cooled through a cooling section to an ambient temperature. Thus, the substrate may be called as annealed substrate or alternatively as heat-set substrate. Annealing may enhance dimensional stability of the substrate. According to an embodiment, the machine direction oriented substrate may be non-annealed after stretching. In other words, the oriented substrate is cooled after stretching without an annealing step between the stretching and cooling.

According to at least some/all embodiments the oriented substrate is dimensionally stable i.e. non-shrinkable at subsequent operation temperatures. The oriented substrate is dimensionally stable e.g. during following label laminate converting steps and during labelling. For example, the oriented substrate has a shrinkage less than 5%, preferably less than 2%, or more preferably less than 1% at temperatures below 30 degrees C.

Figure 6:
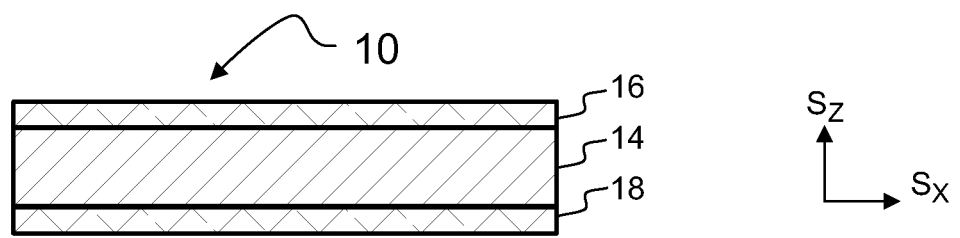
FIG. 6 shows, in a cross-sectional view, an example embodiment of a multilayer substrate structure.

A substrate of the liner may have a monolayer structure. Alternatively, the substrate may have a multi-layer structure comprising two or more layers. Referring to FIG. 6, the substrate may have a three-layer structure including a core layer 14 and two skin layers 16,18 which are on opposing sides of the core layer. Specific composition of the skin layer(s) may have effect on the anchorage of the silicone to the substrate. Further, the skin layer composition may have effect on curing of the silicone. For example, the skin layer enables using of high enough temperatures required for curing of the silicone.

In a multilayer substrate structure the layers can be of equal or different thicknesses. According to an embodiment, thicknesses of the individual layers may be different. Preferably the multilayer has a symmetric structure with respect to the thickness of the layers. For example, in a three layer structure the skin layers have preferably the same thickness. Symmetric multilayer structure may effect on lay-flat properties. Symmetric structure may provide good overall flatness of the substrate. Good overall flatness refers to absence of e.g. creases, wrinkles or wavy edges. Further, good lay-flatness refers to absence of curling of the film.

According to an embodiment, in a three layer substrate structure, thickness of the core layer may be 60% and thickness of each skin layer 20% of the total thickness of the substrate. Alternatively, the structure may comprise very thin skin layers. Skin layer may have thickness of 1% or 2%, preferably 5% or 10% of the total thickness of the substrate. Skin layer thickness may be, for example, between 1 and 30%, or between 1 and 20% of the total substrate thickness. Core layer thickness may be at least 40% of the total thickness of the substrate. Preferably the thickness of the core layer is at least 50% or at least 60% of the total thickness of the substrate. For example, core layer thickness is between 40 and 98%, preferably between 50 and 90% of the total thickness of the substrate.

Total thickness of the oriented multilayer or monolayer substrate may be between 10 and 60 μm, preferably between 15 and 40 μm, and more preferably between 20 and 30 μm. The MD oriented substrate may have a thickness of, for example, 30 μm, preferably 25 μm or 23 μm. According to an example, in a three layer substrate structure a thickness of the core layer is 18 μm and each skin layer has a thickness of 6 μm. Thin substrate may effect on sustainability. Further it has effect on an amount of waste material to be disposed of, recycled or re-used.

In a multilayer substrate structure the composition of layers may be different. Alternatively, the layers may have same composition. Preferably the substrate is plastic (polymeric) based. According to at least some/all embodiments, a substrate of a release liner comprises polyolefin based polymer(s) as a main component. Further, the substrate may include minor component(s) such as filler(s), pigment(s), and/or anti-blocking compound(s). Due to the pigments, e.g. white plastic liners may be achieved. Minor components may be, for example, TiO$_2$, talc and calcium carbonate. Anti-blocking agent may be used in the skin layer(s) of the multilayer substrate structure. Anti-blocking agent may be at least one of the following: silicate, synthetic silica and synthetic kaolin. An amount of anti-blocking compound may be less than 3 wt. %, preferably less than 2 wt. %, for example 2 wt. % or 1 wt. %. Anti-blocking agent may have effect on surface roughness of the substrate.

According to an embodiment, at least one layer of the substrate comprises or consists of propylene block copolymer. Preferably, all individual layers of the multilayer structure comprise or consist propylene block copolymer. In addition, the layer(s) may comprise propylene homopolymer. Alternatively or in addition, the layer(s) may comprise random propylene copolymer.

Propylene homopolymer contains only propylene monomers along a polymer chain. In copolymers the chains may be composed of two or more different monomers. Propylene block copolymer is one in which monomers are clustered in blocks along the chain. Propylene block copolymer may comprise monomers of propylene and ethylene. Propylene block copolymer may comprise different components segregated into discrete blocks. For example, propylene block copolymer composition comprises a component of propylene copolymer containing 1-20 wt. % of olefins other than propylene and another component (isolated domains) of propylene copolymer containing 5-98 wt. % olefins other than propylene. Alternatively, propylene block copolymer may comprises 50-80 wt. % of propylene homopolymer and 20-50 wt. % of propylene copolymer with 1-70 wt. % of alkene other than propylene added to it by polymerization. Alkene may be linear or branched alkene, such as ethylene, butene, pentene, hexene, heptene or octene as well as mixture of these co-monomers.

In random copolymer different monomers are randomly dispersed along the chain. A random propylene copolymer may contain ethylene and/or another alpha-olefin. A random propylene copolymer may contain propylene and another alpha-olefin, such as $C_2$-$C_{10}$, preferably $C_4$-$C_6$ alpha-olefin. A random propylene copolymer may comprise monomers of propylene and ethylene and/or butylene (butene). Random copolymer may be, for example, propylene-ethylene copolymer or propylene-butylene copolymer. The amount of propylene may be 60 to 98 wt. % and the amount of co-monomer may be 2 to 40 wt. %.

According to an embodiment, in at least one layer of the substrate an amount of propylene block copolymer is at least 40 wt. % of the total content of the polymer based materials. An amount of propylene block copolymer is preferably at least 50 wt. % or more preferably at least 60 wt. %. Total content of propylene block copolymer may be between 40 and 100 wt. %, preferably between 50 and 100 wt. %, or between 60 and 100 wt. % of the total content of polymer based materials.

According to an embodiment, all the substrate layers, for example in three layer structure, include propylene block copolymer. An amount of propylene block copolymer may be at least 38 wt. % of the total content of the polymer based materials in each of the three layers. An amount of propylene block copolymer is preferably at least 50 wt. % or more preferably at least 60 wt. %. Total content of propylene block copolymer may be between 38 and 100 wt. %, preferably between 50 and 100 wt. %, or between 60 and 100 wt. % of the total content of polymer based materials in each of the three layers. The specific total amount of propylene block copolymer at least 38 wt. % may have effect on tear resistance of the substrate. Further it may have effect on die-cutting performance of the substrate.

According to an embodiment, the substrate further comprises propylene homopolymer and/or propylene random copolymer. An amount of propylene homopolymer and/or propylene random copolymer is at most 60 wt. %, preferably at most 50 wt. % or at most 40 wt. %. According to an example, the amount of propylene homopolymer and/or propylene random copolymer is between 0 and 60 wt. %, preferably between 10 and 60 wt. %, or more preferably between 30 and 50 wt. % or between 30 and 40 wt. %. Specified propylene homopolymer and/or propylene random copolymer content may have effect of further controlling mechanical properties of the substrate.

The substrate comprises less than 10 wt. %, preferably less than 5 wt. %, more preferably less than 2 wt. % of olefin based polymer other than polypropylene. For example, the substrate contains less than 10 wt. %, preferably less than 5 wt. % or less than 2 wt. % polyethylene.

According to an example, a core layer of a three-layer structure includes between 40 and 100 wt. % of propylene block copolymer. Both skin layers include between 38 and 98 wt. % of propylene block copolymer. In addition, the layer(s) may comprise propylene homopolymer. Alternatively or in addition, the layer(s) may comprise random propylene copolymer. According to an embodiment, an amount of propylene homopolymer and/or propylene random is at most 60 wt. %, preferably at most 50 wt. % or at most 40 wt. %. In addition, the skin layers include anti-blocking agent or anti-blocking compound consisting of anti-blocking agent and a carrier polymer, such as polypropylene or polyethylene. For example, an amount of anti-blocking compound comprising an anti-blocking agent and propylene carrier is 3 wt. %, preferably 2 wt. % or 1 wt. %

According to an example, propylene block copolymer has a density of 0.9 $g/cm^3$, when measured according to ISO 1183. Melt flow rate of propylene block copolymer may be 0.95 or 1.2 g/10 min, when measured according to standard ISO 1133 at 230° C./2.16 kg. Alternatively, melt flow rate may be 5 or 7 g/10 min at 20° C./2.16 kg. Preferably, melt flow rate of propylene block copolymer is between 0.9 and 10 g/10 min, preferably between 0.95 and 7 g/10 min, when measured at 230° C. with 2.16 kg.

According to at least some embodiments, the substrate further comprises propylene homopolymer. Substrate may comprise propylene homopolymer in at least one layer. Alternatively all layer of the multilayer structure may comprise propylene homopolymer. For example, propylene homopolymer has a density of 0.9 $g/cm^3$ when measured according to ISO1183. Melt flow rate may be 2.0 or 3.2 g/10 min when measured according to standard ISO1133 at 230° C./2.16 kg. Alternatively, melt flow rate may be 8.0 g/10 min or 25 g/10 min. Preferably, melt flow rate of propylene homopolymer is between 1 and 30 g/10 min, preferably between 2 and 25 g/10 min, when measured at 230° C. with 2.16 kg. Propylene homopolymer may have effect on modulus and stiffness of the substrate. For example, stiffness and modulus may be increased.

According to at least some embodiments, the substrate further comprises propylene random copolymer. For example, propylene random copolymer has a density of 0.9 $g/cm^3$, when measured according to ISO 1183. Melt flow rate may be 1.7 g/10 min, when measured according to standard ISO 1133 at 230° C./2.16 kg. Propylene random copolymer may provide an effect on flexibility of the film. For example, flexibility may be increased.

Low melt flow rate of the propylene polymer(s) may have effect on mechanical properties of the plastic substrate.

According to at least some embodiments, the substrate further comprises nucleating agent(s). An amount of nucleating agent may be between 0.1 and 0.5 wt. %. Nucleating agent may be added as a compound consisting 10 wt. % of nucleating agent and 90 wt. % carrier polymer. An amount of nucleating compound may be between 1 and 5 wt. %. Nucleating agent may be at least one of the following: mineral nucleating agent and organic nucleating agent. Mineral nucleating agents include, for example, carbon black, silica, kaolin, talk, magnesium salt whiskers, heteronuclear dimetal complex of lanthanum and calcium. Organic nucleating agents include salts of aliphatic mono-basic or di-basic acids or arylalkyl acids such as sodium succinate, sodium glutarate, sodium caproate, sodium 4-methylvalerate, aluminum phenyl acetate, sodium cinnamate, aluminum benzoate, sodium or potassium benzoate, sodium beta-naphtholate, lithium benzoate, aluminium tertiary-butyl benzoate, sorbitol derivatives such as dibenzylidene sorbitol, and organic phosphates.

Nucleating agent(s) may have effect on mechanical properties of the substrate. Nucleating agent(s) may provide reduced elongation of the substrate at ambient but also at elevated temperatures. Further nucleating agent(s) may have effect on thermal resistance of the substrate.

According to an example, a monoaxially in machine direction oriented substrate for a release liner has a three layer structure comprising a core layer and two skin layers. All layers include propylene block copolymer and further propylene homopolymer. An amount of propylene block copolymer is 70 wt. % in the core layer and 68 wt. % in the skin layers. Melt flow rate of propylene block copolymer is 0.95 g/10 min, when measured according to standard ISO 1133 at 230° C./2.16 kg. An amount of propylene homopolymer is 30 wt. % in all layers. Melt flow rate of propylene homopolymer is 8.0 g/10 min, when measured according to standard ISO 1133 at 230° C./2.16 kg. In addition, the skin layers include anti-blocking compound consisting of anti-blocking agent and polypropylene. An amount of anti-blocking compound is 2 wt. %. The orientation degree in the machine direction of the substrate is 7. Total thickness of the film is 36 µm. Mechanical properties in machine direction (MD) of the substrates are provided in table 1. Mechanical properties for comparative samples of biaxially oriented polypropylene liners, BOPP (tenter frame processed) having thickness of 34 µm and BOPP (blown) having thickness of 31 µm, are also provided. Further, properties for PET substrate having thickness of 23 µm are provided. Six parallel samples were tested. Sample width used in tests was 15 mm. 1% secant modulus values were defined according to ISO 527-3 standard, wherein the measured tension values are multiplied by 100 for reporting the 1% secant modulus results, i.e. 1% secant modulus value of 2000 MPa tension corresponds to 20 MPa actual tension value. Following formula was used to calculate force needed for 1% elongation of samples having a width of 15 mm:

$$\sigma = \frac{F}{A} \Rightarrow$$
$$F = \sigma * A = 1\% \text{ secant modulus} *$$
thickness of the sample * width of the sample

TABLE 1

|  | MDO substrate 36 µm | Glassine paper 53 µm | PET, 23 µm | BOPP, tenter frame, 34 µm | BOPP, blown, 31 µm |
|---|---|---|---|---|---|
| 1% secant modulus in MD, MPa [std] | 3237 [142] | 9324 [268] | 4298 [121] | 1934 [27] | 2452 [38] |
| Web tension required for 1% elongation in MD, N/m | 1165 | 4954 | 1109 | 656 | 767 |

At least some/all embodiments have 1% secant modulus of the substrate in MD at least 2800 MPa, for example between 2800 and 3800 MPa or between 3000 and 3600 MPa. 1% secant modulus of at least some/all embodiments in TD is at least 500 MPa, for example between 500 and 1200 MPa, or between 700 and 1000 MPa. 1% secant modulus at least 2800 MPa, preferably at least 3000 MPa of the substrate in MD reduces the risk for misplacing the labels in labeling process.

At least some/all embodiments have ratio of elongation (at break) in MD to tensile strength (at break) in MD of the substrate less than 0.1, for example, between 0.01 and 0.1 or between 0.02 and 0.08.

At least some/all embodiments have reduced elongation under tension in the orientation direction of the substrate. For example, uniaxially in machine direction oriented substrate has reduced elongation (strain) in machine direction. Reduced elongation may have effect on misplacement of labels during subsequent processes, such as dispensing. At least some/all embodiments have elongation in the machine direction of the substrate less than 3%, preferably less than 2%, or more preferably less than 1% at tension level between 200 and 1200 N/m.

At least some/all embodiments have effect on mechanical stability and mechanical capability of the substrate and label laminate comprising the substrate during subsequent label converting, such as during rewinding at printing machine and during labelling at dispensing line. At least some/all embodiments provide effect of resistance against elongation and/or strain applied to the substrate. At least some/all embodiments have effect on resisting tension of at least 200 N/m, preferably at least 500 or 600 N/m, more preferably at least 900 N/m. Plastic substrate has also effect on easy re-cycling of the substrate. For example, there is no need for de-siliconising step.

At least some/all embodiments have high elongation at break in transverse direction of the substrate. Elongation at break in transverse direction of the substrate is at least 100%, preferably at least 200%, for example, between 100 and 500% or between 300 and 500%. Elongation at break may be even 900%, for example between 100 and 900%, or preferably between 300 and 800% or between 500 and 800%. Ratio of 1% secant modulus of the substrate in MD to elongation (at break) in CD (TD) of the substrate is less than 15 or less than 12, preferably less than 10, less than 7 or less than 5. For example, between 2 and 15 or between 2 and 10, preferably between 3 and 15 or between 3 and 10.

At least some/all embodiments have effect on flexibility of the substrate in transverse direction of the substrate. Flexibility of the substrate in TD enables, for example, efficient die-cutting of the label laminate. For example, under die-cutting pressure tearing of the substrate in MD may be avoided. At least some/all embodiments have increased flexibility in TD of the substrate. Increased flexibility in TD may effect on tearing resistance of the substrate in MD. At least some/all embodiments have increased tearing resistance in machine direction of the substrate. Tearing resistance of the substrate in MD may be at least 0.1 N, for example, between 0.1 and 0.5 N At least some/all embodiments have effect on tearing resistance of the substrate in TD. Tearing resistance of the substrate in TD may be at least 0.1 N, for example, between 0.1 and 0.5 N, preferably between 0.2 and 0.5 N.

The embodiments described above are only example embodiments of the invention and a person skilled in the art recognizes readily that they may be combined in various ways to generate further embodiments without deviating from the basic underlying invention.

The invention claimed is:

1. A release liner for a label laminate, wherein the release liner comprises a substrate having a multilayer structure comprising at least a core layer, a first skin layer and a second skin layer, and wherein each of the layers comprise at least 38 weight percent propylene block copolymer and at most 60 weight percent of at least one of propylene homopolymer and propylene random copolymer,
  wherein the substrate is uniaxially oriented in a machine direction of the substrate.

2. A release liner according to claim 1, wherein an elongation of the substrate in the machine direction is less than 3% at a tension level between 200 and 1200 N/m.

3. A release liner according to claim 1, wherein a ratio of 1% secant modulus in machine direction of the substrate to elongation in transverse direction of the substrate is between 2 and 15.

4. A release liner according to claim 1, wherein an amount of propylene block copolymer is at least 68 wt. %.

5. A release liner according to claim 1, wherein a release layer is arranged onto one surface of the substrate.

6. A release liner according to claim 1, wherein an amount of propylene homopolymer and/or propylene random copolymer is at most 30 wt. %.

7. A release liner according to claim 1, wherein the substrate further comprises between 0.01 and 0.05 wt. % of a nucleating agent.

8. A release liner according to claim 1, wherein an amount of olefin based polymer(s) other than polypropylene is less than 10 wt. %, preferably less than 5 wt. %, more preferably less than 2 wt. %.

9. A release liner according to claim 1, wherein the skin layer(s) further comprise anti-blocking agent.

10. A release liner according to claim 1, wherein the substrate comprises an orientation degree in the machine direction of the substrate between 5 and 10, preferably between 6 and 9.

11. A release liner according to claim 1, wherein total thickness of the substrate is between 10 and 60 microns, preferably between 15 and 40microns, more preferably between 20 and 30 microns.

12. A release liner according to claim 1, wherein the oriented substrate has a shrinkage less than 5%, preferably less than 2%, or more preferably less than 1% at temperatures below 30 degrees C.

13. A label laminate comprising a face stock, a release liner and an adhesive layer between the face stock and the release liner, wherein the release liner comprises a substrate having a multilayer structure comprising at least a core layer, a first skin layer and a second skin layer, and wherein each of the layers comprise at least 38 weight percent propylene block copolymer and at most 60 weight percent of at least one of propylene homopolymer and propylene random copolymer,
wherein the substrate is uniaxially oriented in a machine direction of the substrate.

14. A label laminate according to claim 13, wherein
an elongation of the substrate in a machine direction of the substrate is less than 3% at a tension level between 200 and 1200 N/m.

15. A label laminate according to claim 13, wherein
a ratio of 1% secant modulus in machine direction of the substrate to elongation in transverse direction of the substrate is between 2 and 15.

16. A label laminate according to claim 13, wherein an amount of propylene block copolymer is at least 68 wt. %.

17. A label laminate according to claim 13, wherein a release layer is arranged between the adhesive layer and the substrate of the release liner.

18. A label laminate according to claim 13, wherein an amount of propylene homopolymer and/or propylene random copolymer is at most 30wt. %.

19. A label laminate according to claim 13, wherein the substrate further comprises between 0.01 and 0.05 wt. % of a nucleating agent.

20. A label laminate according to claim 13, wherein an amount of olefin based polymer(s) other than polypropylene is less than 10 wt. %, preferably less than 5 wt. %, more preferably less than 2 wt. %.

21. A label laminate according to claim 13, wherein the skin layer(s) further comprise anti-blocking agent.

22. A label laminate according to claim 13, wherein the substrate comprises an orientation degree in the machine direction of the substrate between 5 and 10, preferably between 6 and 9.

23. A label laminate according to claim 13, wherein total thickness of the substrate is between 10 and 60 microns, preferably between 15 and 40 microns, more preferably between 20 and 30 microns.

24. A label laminate according to claim 13, wherein the oriented substrate has a shrinkage less than 5%, preferably less than 2%, or more preferably less than 1% at temperatures below 30 degrees C.

25. A label laminate according to claim 13, wherein the label laminate is self-adhesive in which the adhesive layer comprises pressure sensitive adhesive.

26. A method for providing a label laminate according to claim 13, the method comprising:
forming a substrate by melt processing technique;
stretching the substrate uniaxially in a machine direction of the substrate for providing a machine direction oriented substrate;
coating one surface of the machine direction oriented substrate with a release agent layer for providing a release liner;
applying an adhesive layer over the release agent layer and/or over a face material layer; and
laminating the release liner with the face material layer for providing the label laminate having the adhesive layer in between the release liner and the face material wherein the substrate having a multilayer structure comprising at least a core layer.

27. A method according to claim 26, wherein the method further comprises cooling of the machine direction oriented substrate to an ambient temperature right after the stretching for providing a non-annealed substrate.

28. A method according to claim 26, wherein the method further comprises:
annealing of the machine direction oriented substrate after the stretching for providing an annealed substrate; and
subsequently cooling the annealed substrate to an ambient temperature.

* * * * *